(12) United States Patent
Abbott

(10) Patent No.: US 6,313,391 B1
(45) Date of Patent: Nov. 6, 2001

(54) SOLAR POWER SYSTEM USING THERMAL STORAGE AND CASCADED THERMAL ELECTRIC CONVERTERS

(76) Inventor: Russell M. Abbott, 2616 Cross St., Riverside, CA (US) 92503

( * ) Notice: Subject to any disclaimer, the term of this patent is extended or adjusted under 35 U.S.C. 154(b) by 0 days.

(21) Appl. No.: 09/541,476

(22) Filed: Mar. 31, 2000

Related U.S. Application Data

(60) Provisional application No. 60/127,638, filed on Apr. 2, 1999.

(51) Int. Cl.[7] .................................................. H01L 37/00
(52) U.S. Cl. ........................................... 136/200; 136/206
(58) Field of Search .................................... 136/206, 200

(56) References Cited

U.S. PATENT DOCUMENTS

| 4,251,291 | * | 2/1981 | Gomez | 136/206 |
| 4,313,024 | | 1/1982 | Horn | 136/253 |
| 4,469,088 | | 9/1984 | Anzai et al. | 126/436 |
| 4,545,366 | | 10/1985 | O'Neill | 126/440 |
| 4,612,913 | | 9/1986 | Mori | 126/438 |
| 4,619,244 | | 10/1986 | Marks | 126/451 |
| 4,723,826 | | 2/1988 | Whitaker | 350/96.1 |
| 4,841,946 | | 6/1989 | Marks | 126/451 |
| 5,143,051 | | 9/1992 | Bennett | 126/415 |
| 5,518,554 | * | 5/1996 | Newman | 136/206 |
| 5,578,140 | | 11/1996 | Yogev et al. | 136/246 |

OTHER PUBLICATIONS

Sievers, et al., Performance Evaluation of Gas–Fired AMTEC Power Systems, Advanced Modular Power Systems, Inc., Abstract.

Anderson, et al., Thermionic System Space Radiator Design, http://www.doe.gov, Abstract, Jan. 1, 1994.

Horner, et al., Design and Operation of a Thermionic Converter in Air, http://www.doe.gov, Abstract, Jan. 1, 1994.

Hagan, et al., Thermionic/AMTEC Cascade Concept for High–Efficiency Space Power, http://www.doe.gov, Abstract, Jan. 1, 1996.

Svensson, et al., TEC as Electric Generator in an Automobile Catalytic Converter, http://www.doe.gov, Abstract, Jan. 1, 1996.

Kalandarishvili, et al., The Method of Creating a Small Interelectrode in Thermionic Energy Converters, http://www.doe.gov, Abstract, Jan. 1, 1996.

Kimnach, et al., Design of a Power Management and Distribution System for a Thermionic–diode Powered Spacecraft, http://www.doe.gov, Jan. 1, 1996.

Ender, et al., Terrestrial Solar Power System Based on Cs–Ba Thermionic Converter, Space Technology and Applications Forum—1999.

\* cited by examiner

*Primary Examiner*—Kathryn Gorgos
*Assistant Examiner*—Thomas H Parsons
(74) *Attorney, Agent, or Firm*—Knobbe, Martens, Olson & Bear, LLP

(57) ABSTRACT

A solar powered electricity generating system comprised of a concentrator assembly that concentrates solar flux into a thermal storage unit. The thermal storage unit converts solar energy into heat energy which is then provided to three cascaded converter stages which, in the preferred embodiment, are comprised of a thermionic electric converter (TEC), an alkaline metal thermal to electric converter (AMTEC) and a thermoelectric generator stage comprised of a plurality of thermal photovoltaic cells. A phase change material is positioned within the thermal receiver such that the solar flux converts the material from a solid phase into a liquid phase such that the thermal storage unit can continue to generate heat energy when the sun is no longer providing thermal flux to the receiver as a result of the heat energy produced as the phase change material changes back from a liquid phase to a solid phase.

44 Claims, 4 Drawing Sheets

SOLAR POWER SYSTEM USING THERMAL STORAGE AND CASCADED THERMAL ELECTRIC CONVERTERS

CROSS REFERENCE TO RELATED APPLICATIONS

This application claims the benefit of U.S. Provisional Application No. 60/127,638 filed Apr. 2, 1999 entitled Solar Power System Using Thermal Storage and Cascaded Thermal Electric Converters and this application is hereby incorporated by reference in its entirety.

BACKGROUND OF THE INVENTION

1. Field of the Invention

The present invention relates to electrical power systems and, in particular, concerns a power generation system that generates electrical power from solar energy through the use of cascaded thermal electric converters and generators.

2. Description of the Related Art

Power generation in industrialized countries at the present time often requires the use of environmentally unfriendly systems. In particular, the increase use of fossil fuel based power plants in the generation of electrical power has resulted in significant air pollution problems throughout both the industrialized and developing world. Alternatives to fossil fuel plants at the moment appear to continue to have significant environmental problems or are impractical for large scale implementation. For example, the use of hydroelectric power generation facilities often results in the interruption of migration routes for fish and suitable locations for hydroelectric facilities are often limited. The use of nuclear power plants is also an alternative to fossil fuel based power plants, however, nuclear power plants typically produce radioactive waste which presents a whole host of additional environmental problems.

These environmental problems have led to the development of various types of solar power systems, which create electricity from solar radiation. The typical solar cell that is in use today is generally a semiconductor solar cell that converts light energy from the sun into electric potential energy. In particular, photons interact with a depleted region of a p-n junction and produce electron-hole pairs therein. The electrons freed on the n side of the p-n junction recombine with the holes created on the p side, thus, resulting in an increased electric potential across the p-n junction. However, one difficulty with existing solar cells is that they are very expensive to manufacture, are relatively inefficient and require a large area of exposure to sunlight to generate significant electrical power.

Another type of solar base power system comprises systems where thermal energy from the sun is concentrated so as to heat a particular liquid which can then be used for heating purposes or can be used to drive a turbine to generate electrical energy. Again, the efficiency of these types of systems is relatively low and cost prohibitive to allow for wide spread use as a power generation system.

In particular applications, most notably space applications, different types of solar based power systems have been developed. These systems include thermal electric converters that directly convert heat energy into electrical energy. One such system is a thermionic electrical converter (referred to as a TEC) that receives an input flow of thermal energy at a first end, having a high temperature $T_H$, converts a portion of the input thermal energy directly into electrical energy, and expends the unconverted thermal energy through a second end having a lower temperature $T_L$. In general, a thermionic converter operates between a particularly high temperature difference such that there is ionization of the material comprising the TEC which results in current flow. One example of a thermionic converter is a Cesium-Barium thermionic converter (Cs—Ba) which will produce electrical energy when exposed to relatively high temperature differences, e.g. on the order of 1500 to 2000 K. These types of thermionic converters are described in greater detail in an article entitled: Terrestrial Solar Power System Based on CS—BA Thermionic Converter published in Space Technology and Application International Forum 1999 by A. Ya Ender et al.

Since TEC's expend a substantial portion of the input flow of thermal energy without converting it into electrical energy, TEC's are relatively inefficient. To address this problem, various bimodal thermoelectric generators which incorporate both thermionic converters (TEC's) and a lower temperature alkaline metal thermal to electric converter (AMTEC) has been proposed. The efficiency of a combination TEC and AMTEC device is improved as the AMTEC device produces additional electrical power by using the unconverted thermal energy that is expended by the TEC.

While these particular systems improve the efficiency of transferring solar heat into electrical energy, these systems still are relatively inefficient such that the ratio of the cost of the device over the electrical energy produced is still too high for wide spread use for earth based power systems. A further difficulty that all of these solar power systems have is that the time period of operation is typically limited to only that portion of the day in which the system will receive direct sunlight. It will be appreciated that this time period may be relatively short due to the sun setting at night and also due to the fact that the sun may be located so low on the horizon during the early morning and late afternoon hours such that there is insufficient sunlight to produce heat energy with the temperatures necessary to operate thermal electric converters such as TEC's and AMTEC's. In fact, it is generally understood that for earth based solar power systems, the amount of time the sun is sufficiently directly incident on the power system to produce electrical power is limited to only 5 hours per day. During the remaining 19 hour period, the sun is either set or is low enough on the horizon that it is not providing sufficient solar flux to the solar power system to generate electrical energy. This is an inherent limitation of most existing solar power systems which limits their applicability to generation of power on an economical basis.

From the foregoing, it will be appreciated that there is a continuing need for solar power generation systems that are capable of producing electrical power with greater efficiency. Moreover, there is an ongoing need for a system that is capable of producing electrical power during longer periods and, in particular, during time periods where the system may not be receiving direct sunlight.

SUMMARY OF THE INVENTION

The aforementioned needs are satisfied in one aspect by a solar powered system that converts an input flow of radiant energy emitted from the sun into an output flow of electrical energy. This solar power assembly comprises a solar energy concentrator assembly having a first aperture and a second aperture wherein the solar energy concentrator assembly collects a primary flux of radiant energy from the sun that enters the first aperture and redirects the primary flux of radiant energy so that a second flow of radiant energy exit the second aperture. The assembly also comprises a solar energy absorber assembly that has a first absorbing surface, wherein the first absorbent surface is positioned adjacent the second aperture of the solar energy concentrator assembly so that the second flow of radiant energy is substantially absorbed by the solar energy absorber so as to generate a first flow of thermal energy. The system also comprises a thermal energy receiver having a housing and a thermal storage material position therein wherein the thermal energy receiver receives the first flow of thermal energy from the solar energy absorber so that the thermal energy is added to the thermal storage material when the solar energy concentrator assembly collects radiant energy from the sun. The system also includes at least one thermal electric converter assembly that receives a second flow of thermal energy from the thermal energy receiver and converts the second flow of thermal energy into an output flow of electrical energy.

In another aspect of the invention, the thermal electric converter assembly is comprised of a multi-stage thermal electric converter which has a first stage that converts energy having a temperature within a first temperature range into electrical energy that is cascaded with a second stage converter that operates at a second temperature range less than the first temperature range so as to produce additional electrical energy and a third stage converter that produces electrical energy from thermal energy provided by the second stage converter that has a temperature within a third temperature range less than the second temperature range. It will be appreciated that the use of three cascaded thermal electric converter stages each having a temperature range that is less than the range of the previous stage results in greater efficiency in generating electrical energy from thermal energy. In one particular embodiment, the first converter stage is comprised of a Cesium Barium thermionic electrical converter (TEC), the second converter stage is comprised of an alkaline metal thermal to electric converter (AMTEC) and the third converter stage is comprised of a segmented thermoelectric generator such as a thermal photovoltaic cell array.

In one embodiment, the solar energy system includes a concentrator assembly that includes a fresnel lens that is adapted to allow for collection of solar energy when the sun is positioned closer to the horizon. The primary concentrator concentrates the solar flux to a non-imaging secondary concentrator such that the solar flux is increased at a ratio of greater than 10,000 to 1 which is sufficient to achieve at least a 2,500 K. receiver temperature.

In yet another aspect, a solar power system for converting solar power into electrical power is provided. The system comprises a solar flux concentrator assembly for concentrating a first flux of solar power into a concentrated second flux of solar power. The system further comprises a thermal energy storage unit disposed so as to receive the second flux of solar power from the solar flux concentrator, said thermal energy storage unit converting the second flux of solar power into thermal energy. The system further comprises a converter assembly disposed so as to receive thermal energy from the thermal energy storage unit, said converter assembly comprising cascaded first, second, and third stages that (a) respectively receive a first, second, and third input flow of heat, (b) respectively convert a portion of the first, second, and third input flows of heat into a first, second, and third output flow of electrical power, and (c) respectively output a first, second, and third output flow of heat. The first stage is disposed adjacent the thermal energy storage unit so as to receive the first input flow of heat therefrom. The second stage is disposed adjacent the first stage so as to receive the second input flow of heat therefrom and the third stage is disposed adjacent the second stage so as to receive the third input flow of heat therefrom.

In still yet another aspect, a method of producing electrical power is provided which comprises receiving a first flux of solar power and concentrating the first flux of solar power into a second flux of solar power. The second flux of solar power is then converted into thermal energy so as to provide a first output flow of thermal power. A first flow of electrical power is produced from the first output flow of thermal power such that a second output flow of thermal power is provided. A second flow of electrical power is produced from the second output flow of thermal power such that a third output flow of thermal power is provided. A third flow of electrical power is then produced from the second output flow of thermal power.

The use of multiple cascaded thermal electric converter stages in combination with a two-stage concentrator results in greater efficiency in converting solar energy into electrical energy. Moreover, the use of a heat storage media such as a phase change material allows for longer periods of operation of the solar power system. These and other objects and advantages of the present invention will become more fully apparent from the following description taken in conjunction with the accompanying drawings.

DETAILED DESCRIPTION OF THE PREFERRED EMBODIMENT

Figure 1:
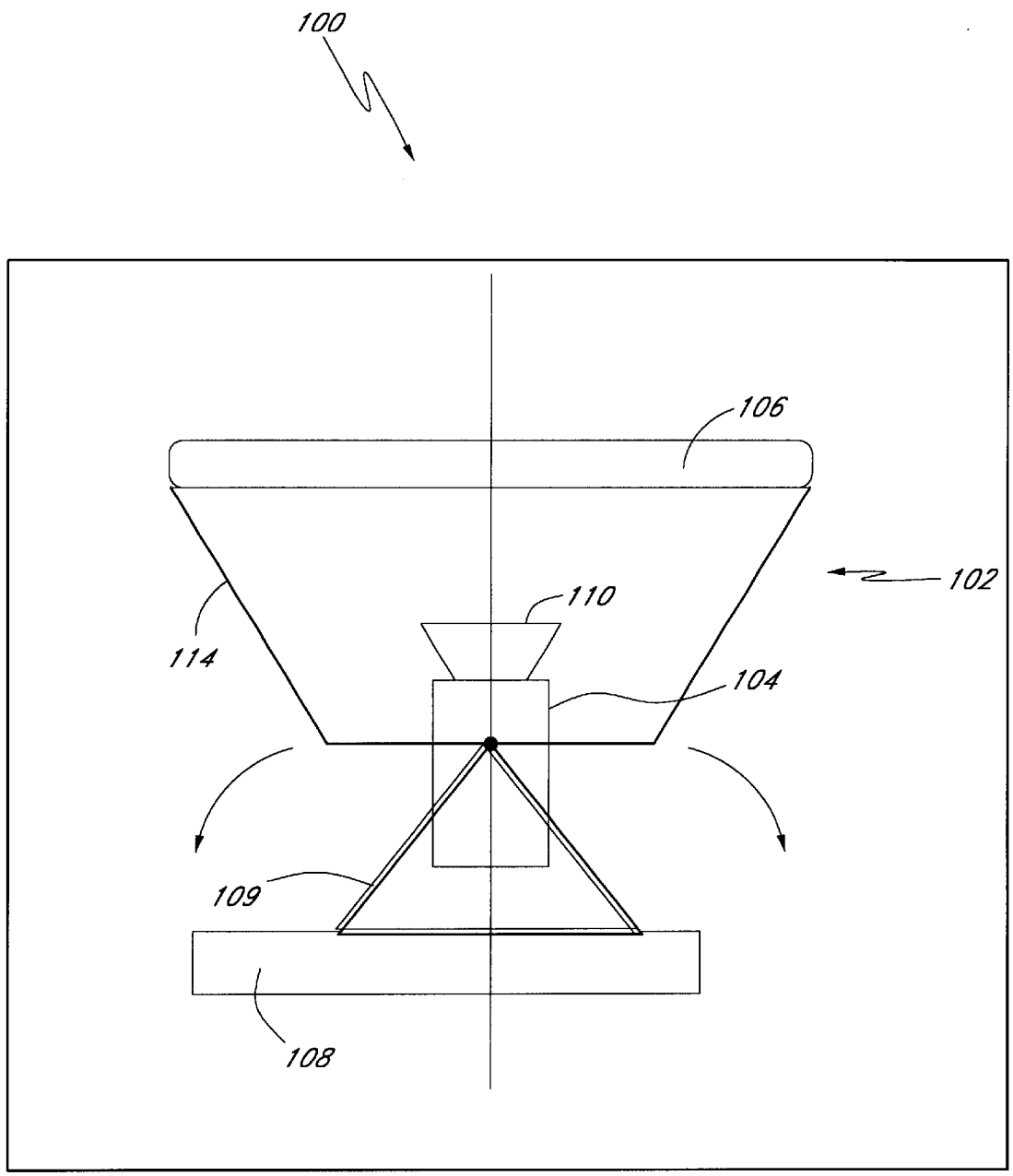
FIG. 1 is a schematic illustration of one embodiment of a solar power system.

Reference will now be made to the drawings wherein like numerals refer to like parts throughout. FIG. 1 is a schematic illustration of one embodiment of a solar power system 100 that converts radiant energy from the sun, or solar energy, into electrical energy in a clean and efficient manner. As will be described in greater detail below, the solar power system 100 incorporates a thermal storage unit and a cascaded thermal electric converter assembly which converts heat energy produced by the sun into electrical energy. The solar power system in this embodiment is comprised of a concentrator subsystem 102 that receives incoming solar power having a first power per unit of cross-sectional area, or flux, and outputs a more concentrated second flux. The second flux is then directed into a thermal storage and cascaded thermal electric receiver 104. The receiver 104 receives the second solar flux from the concentrator subsystem 102 and converts the concentrated second flux into a flow of electrical energy in a manner that will be described in greater detail below.

As is illustrated in FIG. 1, the concentrator subsystem 102 is comprised of a primary concentrator 106 which receives the first flux of solar energy from the sun and develops an intermediate solar flux which is concentrated to a secondary concentrator 110. In this embodiment, the primary concentrator 106 is comprised of a fresnel lens and the secondary concentrator 110 is a non-imaging concentrator, such as a cone shaped reflective surface. The fresnel lens preferably includes a thin (e.g. 0.002 inch) transparent sheet of plastic material upon which prisms have been formed. The prisms direct the first flux towards a focal point some distance away from the primary concentrator 106, at which point the secondary concentrator 110 is preferably located.

It will be appreciated that fresnel lenses provide many advantages. In particular, they are generally lightweight, they are capable of being manufactured out of segments which facilitate assembly, and they are further capable of directing solar flux towards the focal point over a wider range of positions of the sun relative to the fresnel lens. More particularly, since the upper surface of the fresnel lens is coated with prisms, some solar flux may be directed towards the focal point even when the sun is positioned adjacent the horizon depending upon the configuration of the prisms. In one embodiment, the primary concentrator 110 is comprised of a 3 meter diameter fresnel lens for a 7 kW power system and, in another embodiment, the primary concentrator is comprised of a 5 meter diameter fresnel lens for a 25 kW power system.

Figure 2A:
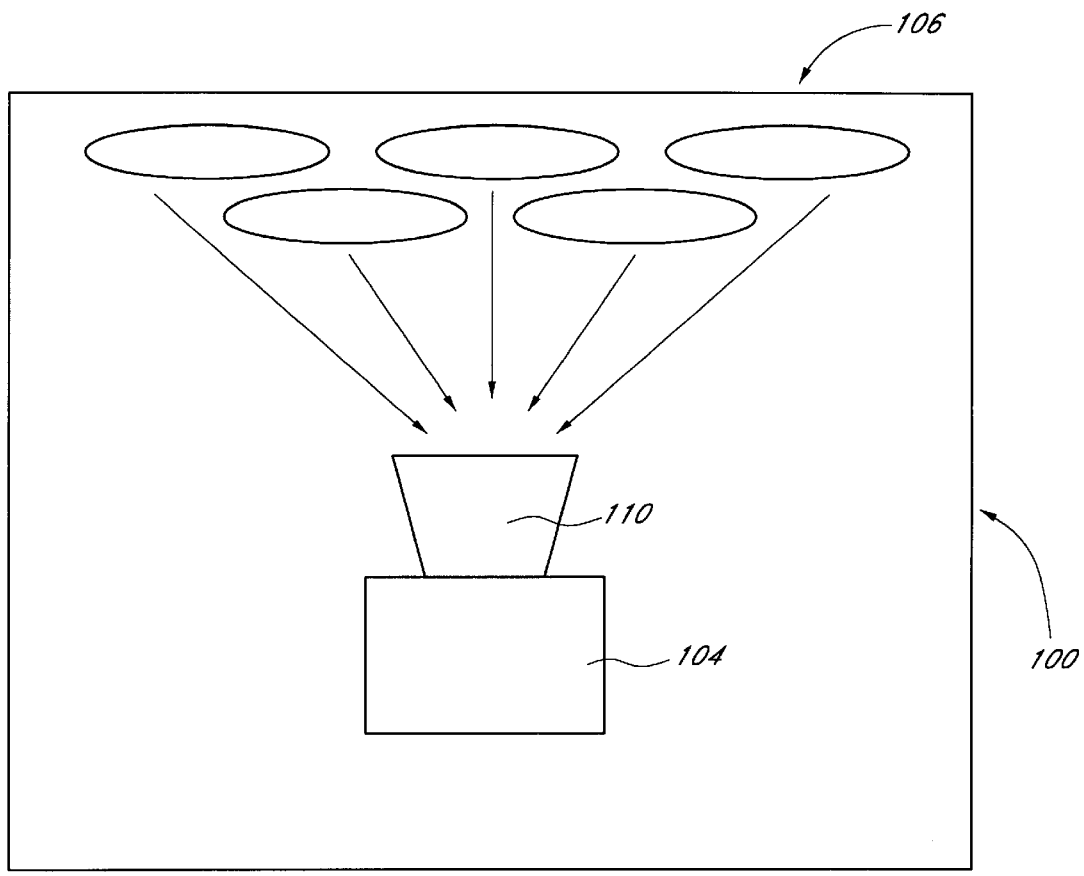
FIGS. 2A and 2B are schematic illustrations of the solar power system of FIG. 1 illustrating various methods of concentrating solar flux into a thermal storage and in a cascaded thermal electric converter unit.
Figure 2B:
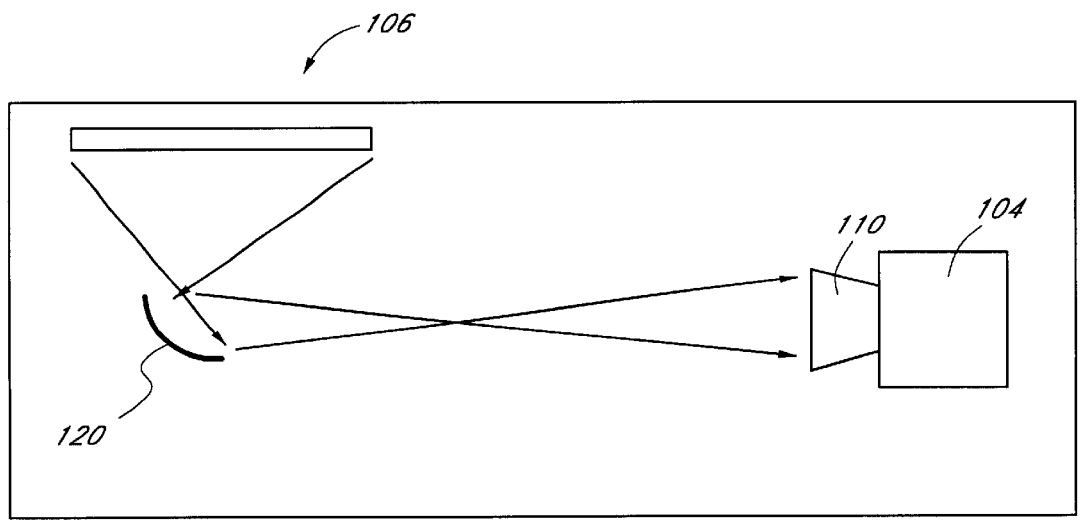

It will be appreciated from the description of FIGS. 2A and 2B that the primary concentrator 106 can be comprised of any of a number of different focusing devices which focuses the first solar flux into the intermediate solar flux directed towards the secondary concentrator 110. The secondary concentrator 110 is of a type known in the art and is essentially comprised of a reflective concave surface which further concentrates the intermediate solar flux into the even more concentrated second solar flux which is delivered into the thermal receiver 104. The secondary concentrator 110, in one embodiment, is comprised of a cone or trumpet or tailored edge ray concentrator of a type known in the art that is used to collect the solar flux and direct it into the thermal receiver 104. Preferably, the concentrator subsystem 102 concentrates the solar flux from the sun to a ratio of over 10,000 to 1 which is sufficient to provide a thermal storage unit of the receiver 104 with a temperature on the order of 2500 Kelvin.

As is also illustrated in FIG. 1, the secondary concentrator 110 is preferably positioned at an inlet to the thermal receiver unit 104 such that the primary concentrator 106 and the secondary concentrator 110 are located above the receiver 104. Hence, the concentrators 106 and 110 also serve as a shield that reduces exposure of the receiver 104 to atmospheric elements such as wind, rain, hail, and snow. Since the receiver 104 is less affected by these elements, thermal energy leakage from the receiver 104 is reduced and the operating lifetime of the receiver 104 is increased. For example, since the concentrators 106 and 110 substantially shield the receiver 104 from wind, thermal energy leakage due to convective heat loss is reduced. Furthermore, debris carried by wind, such as sand, is less likely to damage the receiver 104.

The primary concentrator 106 is positioned on a well-known lens support 114 such that the primary concentrator 106 is positioned over the secondary concentrator 110 which is mounted to the inlet to the receiver 104. As a consequence, the primary concentrator 106 provides protection for the components of the receiver 104. As is also illustrated in FIG. 1, the receiver 104 and the associated concentrator system 102 may also be mounted on a base 108 with a corresponding rotatable joint structure 109. The rotatable joint structure 109 may be configured so that the concentrator subsystem 102 can be oriented with respect to the sun so as to maximize the solar flux being collected by the concentrator subsystem 102 as the sun moves through the sky. It will be appreciated that the exact configuration of the base 108 and the rotatable joint structure 109 will vary depending upon the size and configuration of the receiver 104 and the concentrator subsystem 102.

It will be appreciated that larger solar power systems with higher electrical outputs will require even larger primary concentrators 106 such that the size of the primary concentrator may be so large so as to be prohibited from a cost stand point. FIG. 2A illustrates one approach to solving this particular problem in that a plurality of primary concentrators 106 such as fresnel lenses or parabolic mirrors can be sized and positioned so as to provide multiple paths of solar flux into the secondary concentrator 110 to concentrate the necessary solar energy the receiver 104 needs to produce the desired electrical output. By dividing the primary concentrator 106 into a plurality of smaller concentrators, a system can be produced more efficiently and, thus, at lower cost.

It will be appreciated that any of a number of different manners of mounting the primary concentrators 106 can be used to generate concentrated solar flux to be directed towards the secondary concentrator 110. For example, as shown in FIG. 2B, one or more primary concentrators 106 may be arranged about a light redirecting device 120, such as a parabolic mirror, so that the device 120 provides sufficient solar flux into the secondary concentrator 110 to provide sufficient solar flux into the thermal receiver system 104 to meet whatever the desired daily system output is for the solar power system 100. The manner of mounting the primary concentrators 106 and the light redirecting devices 120 can be in any of a number of different ways known in the art.

It will be appreciated from the following description that one unique aspect of the solar power system 100 is its ability to store thermal energy such that during time periods when the sun is not able to provide solar flux to the system 100, the system 100 can still produce electrical power. The receiver 104 is equipped with a thermal storage unit 105 that will be described in greater detail below in connection with FIG. 3 so as to be able to store sufficient thermal energy so that the solar power system can essentially produce electrical power 24 hours a day.

It is understood that the solar energy provided by the sun is typically only provided during a limited period of the day e.g. on the order of only about 5 hours out of a 24 hour day. Consequently, the concentrator system 102 must be sized so as to be able to provide sufficient solar flux to the receiver 104 and the storage unit 105 contained therein such that there will be sufficient stored thermal energy to permit near continuous operation of the power system 100. This requires a significant concentration of solar flux as, for example, a continuously operating 7 kW solar power system will need to provide 7 kW times 24 hours or 168 kW-hours of heat during this period. This requires the concentrator subsystem 102 to provide the second solar flux during the 5 hour operation period that will provide the 168 kW-hour daily requirement. In this example, for the 7 kW system, the concentrator system 102 must be able to provide the solar equivalent of approximately 30 kW of power to the receiver 104 which would require a fresnel lens type primary concentrator 106 be approximately 7 meters in diameter assuming a solar flux density on the order of 1000 Watts per square meter.

For larger systems, such as a 25 kW system, the primary concentrator 106 may be so large so as to require the distributed system illustrated in FIGS. 2A and 2B. In this example, a 25 kW solar power system will need solar flux equivalent to 120 kW-hour during the 5 hour period which would require the primary concentrator 106 to have a diameter approximately equal to 12 meters. However, concentrators of this size may be impractical necessitating the use of distributed concentrators as discussed above.

Figure 3:
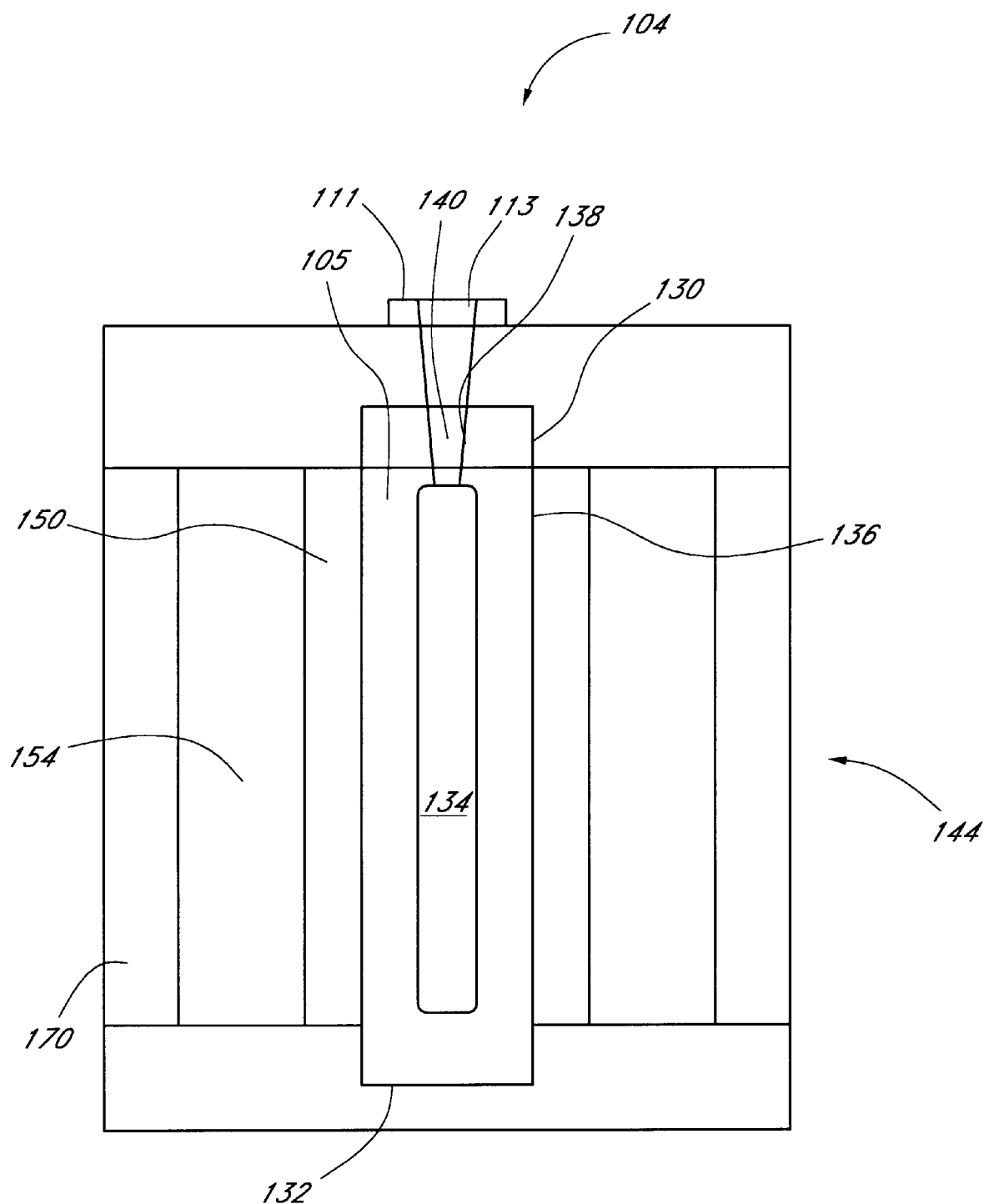
FIG. 3 is a schematic cross sectional illustration of a thermal storage and cascaded thermal electric converter unit of the solar power system of FIG. 1.

As is illustrated in FIG. 3, the receiver 104 is comprised of the thermal storage unit 105 and a plurality of cascaded thermal electric converters stages that convert the thermal energy provided to the receiver 104 into electrical energy. The thermal storage unit 105 comprises a casing 130 that has a plurality of inner walls 132 that define a cavity 134. The inner walls 132 of the casing 130 are lined with a thermal storage material 136 that allows for the storage of thermal energy during time periods when solar flux is not being delivered to the thermal receiver 104 in a manner that will be described in greater detail below. The casing 130 further defines an inlet 140 through which the second solar flux from the secondary concentrator 110 is delivered into the cavity 134. The inlet 140 may also comprise a third concentrator 138 which could also comprise a concave reflective surface similar to that of the secondary concentrator 110.

The thermal storage unit 105 receives the concentrated second solar flux from the concentrator system 102 so as to increase the thermal energy of the thermal storage material 136. The thermal storage material 136 is comprised of a phase change material adapted to change phase, preferably from a solid to a liquid, upon the receipt of sufficient solar flux into the cavity 134 via the inlet 140 from the concentrator system 102. Preferably, the phase change material 136 melts from a solid into a liquid when solar energy is being provided into the thermal storage unit 105 and then solidifies when thermal energy is not being provided by the concentrator system 102. Preferably, the material comprising the phase change material 136 is selected such that the solidifying of the phase change material 136 from a liquid state to a solid state results in the production of heat. Table 1 below illustrates some sample phase change materials that could be used in the solar power system 100 of the preferred embodiment.

TABLE 1

PHASE CHANGE MATERIAL PROPERTIES

| Material | Density kg/m^3 | Cp kJ/kg-K | Heat of Fusion kJ/kg | Melt K | Boil K |
|---|---|---|---|---|---|
| Al$_2$O$_3$ | 4096 | .880 | 1136 | 2345 | 3253 |
| Silicon | 2325 | .678 | 1412 | 1702 | 2589 |
| Aluminum | 2707 | .896 | 398 | 933 | 2333 |

In one example, the thermal storage material 136 is comprised of aluminum oxide (AL$_2$O$_3$) which has a relatively high melting temperature of 2345 K. During initial operation, the concentrated solar flux provided by the concentrator subsystem 102 raises the temperature of the material 136 to the melting temperature of 2345 K, melts the material 136 from the solid phase to the liquid phase, and then increases the temperature of the liquid material 136 to a steady state temperature of approximately 2500 K. Simultaneously, heat is drawn from the storage unit 104 and converted into electrical energy.

During periods when solar energy is not available, as is the case when the sun drops below the horizon, the thermal energy stored within the thermal storage unit 104 is used to produce electrical power. In particular, heat is provided when the temperature of the liquid material 136 drops from 2500 K down to 2345 K and when the material 136 undergoes a phase transition from a liquid to a solid.

Since Al$_2$O$_3$ has a heat of fusion of 1136 kJ/kg and a specific heat of 0.880 kJ/kg-k, in one embodiment, the material 136 requires approximately 236 kg of Al$_2$O$_3$ having a volume of approximately 0.06 m$^3$ so as to provide a 7 kW flow of thermal energy during a 12 hour period of darkness. Hence, the thermal energy stored within the material 136 extends the period of time in which the thermal electric converter devices attached to the thermal storage device 105 will be able to create electricity.

As shown in FIG. 3, the receiver 104 further comprises a multi-stage converter subsystem 144. The subsystem 144 receives heat from the thermal storage unit 105 and converts the heat into electrical energy with a relatively high efficiency. The subsystem 144 comprises a first stage 150 disposed adjacent the unit 105 so as to enable a first input flow of heat to flow from the unit 105 to the first stage. The first stage converts a portion of the first flow of heat into a first flow of electrical power and expends a remaining portion as a first output flow of heat.

As shown in FIG. 3, the multi-stage converter subsystem 144 Further comprises a second stage 154. The second stage 154 is disposed adjacent the first stage 150 such that the first output flow of heat exiting the first stage 150 enables a second input flow of heat that enters the second stage 154. The second stage 154 converts a portion of the second input flow of heat into a second flow of electrical power and expends a remaining portion as a second output flow of heat.

As shown in FIG. 3, the multi-stage converter subsystem 144 further comprises a third stage 170. The third stage 170 is disposed adjacent the second stage 154 such that the second output flow of heat exiting the second stage 154 enables a third input flow of heat that enters the third stage 170. The third stage 170 converts a portion of the third input flow of heat into a third flow of electrical power and expends a remaining portion as a third output flow of heat.

The first, second, and third flows of electrical power are then combined in a manner known in the art so as to provide a relatively large combined output flow of electrical power. Since the efficiency of the device is defined as the ratio of the output flow of electrical power over the first flow of heat provided by the thermal storage unit 105, the solar power system 100 is able to achieve a relatively high efficiency as will be discussed in greater detail below.

Preferably, the first stage 150 comprises at least one Cesium Barium TEC device of a type known in the art such as a Cs—Ba TEC manufactured by General Atomics of San Diego, Calif. which converts heat into electrical energy with a relatively high efficiency. During normal operation, the typical TEC device comprises an emitter having a high temperature and a collector having a lower temperature. Each TEC device of the first stage 150 is disposed such that the first input flow of heat from the storage unit 105 flows into the emitter and such that the first output flow of heat flows from the collector to the second stage 154 of the converter subsystem 144. In response to receiving the first input heat flow from the thermal storage unit 105, electrical energy is generated in a well-known fashion. Table 2 below illustrates the performance characteristics of typical TEC devices that relate to the production of electrical power at various emitter and collector temperatures.

TABLE 2

RESULTS OF EXPERIMENTAL TESTING OF THERMIOMC
CONVERTERS AT VARIOUS TEMPERATURES

| Emitter Temperature (K) | Power Density (w/CM^2) | Conversion Efficiency (%) | Load Voltage (V) | Collector Temperature (K) |
|---|---|---|---|---|
| 2200 | 6.5 | 15.9 | 1.22 | 1400 |
| 2300 | 11.3 | 19.7 | 1.30 | 1410 |
| 2400 | 18.7 | 23.2 | 1.38 | 1430 |
| 2500 | 30.2 | 26.5 | 1.45 | 1460 |
| 2600 | 46.5 | 29.5 | 1.53 | 1490 |
| 2700 | 70.0 | 32.3 | 1.61 | 1510 |

As schematically illustrated in FIG. 3, the first stage 150 of the converter subsystem coaxially mounted about the outer surface of the casing 130 of the thermal 105, however, it will be appreciated that the exact manner in which the first storage mounted to the casing 130 of the thermal storage unit 105 will vary depending upon the configuration of the thermal storage unit and the TEC devices used in different applications.

upon being heated by the thermal storage unit 105, each TEC of the first stage 150 becomes a radiant heat source and provides radiant heat to the second stage 154 which, in this embodiment, comprises at least one alkaline metal thermal to electric converter (AMTEC) device. The first stage is selected to operate in a first temperature range such that it receives the first input flow of heat from the thermal storage unit 105 into the emitter having a first temperature and then emits the first output flow of heat from the collector having a second temperature. Preferably, the second stage 154 is also selected to operate within a second temperature range such that it receives the second input flow of heat from the first stage 150 into an input port having a third temperature and then emits the second output flow of heat from an output port having a fourth temperature. The second temperature range of the second stage 154 is thus selected to be at or less than the higher operational temperature range of the first stage 150 such that the second stage 154 can produce electrical energy using the waste heat of the first stage 150.

It will be appreciated that occasionally the second input flow of heat that is being provided to the second stage 154 exceeds the operational characteristics of the AMTEC devices such that continued operation at the higher temperature may result in damage to the AMTEC devices. As will be described in greater detail below, this embodiment of the preferred invention preferably interposes an adjustable baffle 160 (FIG. 4) that can be configured to regulate the amount of heat being provided to the second stage 154 from the first stage 150. The baffle 160 will be described in greater detail in reference to FIG. 4. Each AMTEC device of the second stage 154 is of a type of AMTEC that is well-known in the art such as a tubular type AMTEC available from Advanced Modular Power Systems of Ann Arbor, Mich.

In one embodiment, the third stage 170 of the converter subsystem comprises a segmented thermoelectric generator which, in this embodiment, is comprised of a plurality of thermal photovoltaic cells that produces electrical energy in response to receiving heat energy from the second stage 154. Preferably, the thermoelectric generator of the third stage 170 is selected to provide electricity in response to receiving the third input flow of heat that is provided as waste heat from the second stage 154. In one embodiment, the thermoelectric generator of the third stage 170 is a generator such as the type developed at Jet Propulsion Laboratory in Pasadena, Calif. which is comprised of several layers of thermoelectric materials attached to generate electricity over a temperature range from approximately 300 K to 973 K. Generally, these thermoelectric generators have an efficiency of about 15%, however, it is expected that next generation thermoelectric converters will have an efficiency of close to 19% or more. In another embodiment, the third stage 170 comprises Thermal Photovoltaic cells available from Jx Crystal of Bellvue, Wash.

It will be appreciated that the solar power system 100 illustrated in FIGS. 1–3 has a plurality of solar energy concentrators that direct solar flux into a receiver 104 wherein the receiver 104 is capable of storing heat energy. The heat energy is provided to a cascaded system of thermal electric converter stages which include TEC devices operating at higher temperatures, AMTEC devices operating at intermediate temperatures and thermoelectric generators operating at lower temperatures. The use of the phase change thermal storage material 136 inside of the thermal storage unit 105 allows for heat to be generated even when the receiver 104 is not receiving solar energy from the concentrator system 102 such that the converter stages can provide electricity during time periods when the sun is not providing sufficient energy to the thermal receiver 104. It will be appreciated that the storage unit 105 and the stages 150, 154 and 170 of the converter subsystem 144 are positioned within a housing which is formed of a heat resistant material such as Tungsten and may also include a radiator system comprised of a plurality of cooling tubes as will be discussed in greater detail below.

Tables 3 and 4 below illustrate two different embodiments of a solar power system of the present invention. Table 3 illustrates the heat flow characteristics of the 7 kW power system 100 having the fresnel-type primary concentrator 110 of approximately 3 meters in diameter. Table 4 illustrates a power system that has a 25 kW thermal input with a primary concentrator 106 diameter of approximately 5.6 meters. Both of these embodiments use aluminum oxide as the thermal stage phase storage material 136 inside of the thermal storage unit 105 so as to provide heat energy during the time periods in which the sun is not providing sufficient energy to the concentrators. As is illustrated in both Tables 3 and 4, the Cs—Ba TEC devices of the first stage 150, the AMTEC devices of the second stage 154 and the thermoelectric generator of the third stage 170 are each selected so as to operate at cascading ranges of temperature so that the heat energy provided by the thermal storage unit 105 is more efficiently used. This allows for the generation of relatively large amounts of power, e.g. 2.963 kW of electrical energy for the 7 kW thermal input device and 10.31 kW of electrical energy for the 25 kW thermal input device with efficiencies of approximate 41 to 42%. Using three cascading thermal electric converter stages and a heat storage system such as the one described above, greater amounts of electrical energy can be produced in a more efficient manner than with previously disclosed devices of a similar nature.

TABLE 3

POWER GENERATION FOR 7KW THERMAL INPUT, PRIMARY
CONCENTRATOR DIAMETER 3M

| Input Source | Heat In | Efficiency | Heat Out | Power Out | Temp Hot | Temp Cold |
|---|---|---|---|---|---|---|
| Solar Flux | 7.99kWth | 90% | 6.40kWth | 0 | 2500K | 2400K |

TABLE 3-continued

POWER GENERATION FOR 7KW THERMAL INPUT, PRIMARY CONCENTRATOR DIAMETER 3M

| Input Source | Heat In | Efficiency | Heat Out | Power Out | Temp Hot | Temp Cold |
|---|---|---|---|---|---|---|
| Cs—Ba | 6.40kWth | 25% | 4.80kWth | 1.60kWe | 2400K | 1350K |
| AMTEC | 4.80kWth | 15% | 4.08kWth | .72kWe | 1273K | 650K |
| TEG | 4.08kWth | 15% | 3.47kWth | .61kWe | 650K | 300K |

Overall efficiency: 42% Power Generated: 2.93 kWe
Assuming a shadow duration of 12 hours, the required thermal storage capacity is 300 MJ using 236 kg of aluminum oxide.

TABLE 4

POWER GENERATION FOR 25KW THERMAL INPUT, PRIMARY CONCENTRATOR DIAMETER 5.6M

| Input Source | Heat In | Efficiency | Heat Out | Power Out | Temp Hot | Temp Cold |
|---|---|---|---|---|---|---|
| Solar Flux | 25.00kWth | 90% | 22.50kWth | 0 | 2500K | 2400K |
| Cs—Ba | 22.50kWth | 25% | 16.87kWth | 5.63kWe | 2400K | 1350K |
| AMTEC | 16.87kWth | 15% | 14.34kWth | 2.53kWe | 1273K | 650K |
| TEG | 14.34kWth | 15% | 12.19kWth | 2.15kWe | 650K | 300K |

Overall efficiency: 41% Power Generated: 10.31 kWe
Assuming a shadow duration of 12 hours, the required thermal storage capacity is 108 MJ using 843 kg of aluminum oxide.

In one embodiment, the receiver 104 further comprises a known shutter 111 having a reducible opening 113 extending therethrough. The shutter 111 is disposed adjacent the inlet 140 so that the opening 113 of the shutter 111 is aligned with the inlet 140. During periods when sufficient solar flux is provided, the opening 113 of the shutter 111 is extended so that the solar flux can travel through the inlet 140 and interact with the thermal storage unit 105.

However, during periods when sufficient solar flux is not provided, such as during nighttime hours or when clouds block the sun, the opening 113 of the shutter 111 is reduced. This inhibits radiant heat from escaping the thermal storage unit 105 through the inlet 140. Thus, since less of the thermal energy of the thermal storage unit 105 is allowed to escape, the shutter 111 provides the solar power system 100 with an enhanced operating efficiency.

Figure 4:
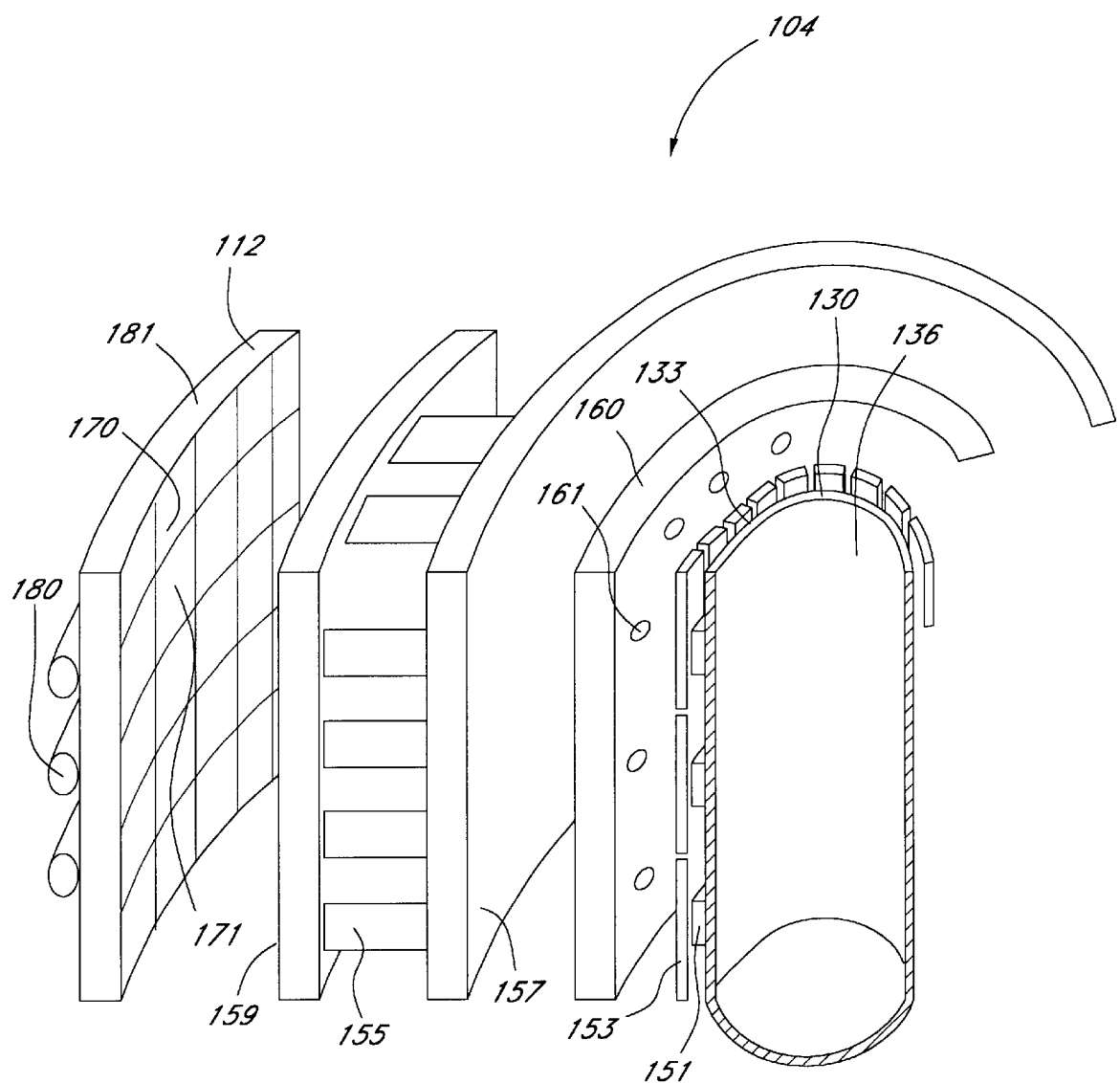
FIG. 4 is an exploded partially cut away view of the physical components of the thermal storage and cascaded thermal electric converter unit of FIG. 3.

FIG. 4 is an exploded partially cut away perspective view illustrating the components of the receiver 104 in greater detail. As is illustrated in FIG. 4, the receiver 104 comprises the container 130 that is made of a material, such as Tungsten that is suitable for retaining its mechanical strength even at high temperatures. The thermal storage phase change material 136 coats the inner surface of the Tungsten casing 130 of the receiver 104. A plurality of TEC devices 151 collectively form the first stage 150 and are positioned on an outer surface 133 of the Tungsten casing 130 in the manner illustrated in FIG. 4. The first stage 150, in this embodiment, is comprised of the plurality of discrete TEC devices 151 that are positioned over substantially the entire outer surface 133 of the receiver 130 so as to maximize the amount of heat energy that is being converted into electrical energy in the first stage 150.

As is also illustrated in FIG. 4, the thermal baffle 160 which, in this embodiment is also made of a Tungsten material is positioned adjacent an outer edge of the TEC devices 151 so as to be adjacent the collectors or radiators 153 of the TEC devices 151. As is illustrated in FIG. 4, the baffle 160 has a plurality of holes 161 having various sizes extending therethrough. By moving the baffle 160, a different sized hole can be positioned in front of the radiators 153 of the TEC devices 151 such that a different amount of radiant heat energy can be passed through the baffle 160 to a plurality of AMTEC devices 155 of the second stage 154. In this way, the amount of heat being provided to the second stage 154 can be controlled thereby protecting the AMTEC devices 155.

As is also illustrated in FIG. 4, the second stage 154 is comprised of the plurality of AMTEC devices 155 that are mounted to a thermally conductive support plate 157. The AMTEC devices 155 also have a plurality of radiators 159 which radiate the waste heat to the thermal electric generator of the third stage 170 which, in this embodiment, is comprised of a plurality thermal photovoltaic cells 171 which are mounted on the inner surface of a housing 112 of the receiver 104. As is also illustrated in FIG. 4, a plurality of cooling lines 180 can also be circulated about an outer wall 181 of the housing 112 so as to remove excess heat from the thermal photovoltaic cells 171 and, consequently, to facilitate the flow of heat energy from the heat storage unit 105 outward to the housing 112 through the three thermal electric converter stages of the power system 100.

In one embodiment, the devices 155 are TEC devices akin to the TEC devices 151 of the first stage 150. However, instead of operating between the high temperature range of the first stage, the TEC devices 155 of the second stage 154 operate between the lower temperatures of the second stage 154.

It will be appreciated from the foregoing description that the solar power system 100 allows for efficient generation of electrical power through the use of multiple concentrators 106 and 110, a heat storage unit 105 having a thermal storage material 136, and cascading arrangement of thermal electric converter stages 150, 154 and 170. In this way, electrical power can be generated from solar power in a more efficient manner as the efficiency of each of the cascaded stages is cumulative and also as a result of using a storage material that allows for continued generation of heat during time periods when the sun is not providing solar energy to the power system 100.

Although the preferred embodiments of the present invention have shown, described and pointed out the fundamental novel features of the invention as applied to these embodiments, it will be understood that various omissions, substitutions and changes in the form of the detail whether the device illustrated may be made by those skilled in the art without departing from the spirit of the present invention. Consequently, the scope of the invention should not be limited to the foregoing description but is to be defined by the appended claims.

What is claimed is:

1. A solar power system comprising:
a concentrator system that receives and concentrates solar flux and delivers concentrated solar flux towards a selected location;
a receiver located at the selected location which receives the concentrated solar flux that generates thermal energy in response to receiving a selected degree of concentrated solar flux;
thermal storage medium coupled to the thermal receiver that stores thermal energy in response to the receiver receiving the concentrated solar flux;
at least one thermal electrical converter stage that receives the thermal energy from the receiver and generates electrical energy from the thermal energy wherein the at least one thermal electrical converter stage also receives thermal energy from the thermal storage medium when the receiver is receiving less than the selected degree of concentrated solar flux so as to be able to produce electrical energy during time periods when the receiver is receiving less than the selected degree of concentrated solar flux; and
a heat flow regulator that regulates transfer of the thermal energy between the at least one thermal electrical converter stage.

2. The system of claim 1, wherein the concentrator system is comprised of a primary concentrator and a secondary concentrator.

3. The system of claim 2, wherein the primary concentrator comprises a fresnel lens and the secondary concentrator is positioned at a focal point of the primary concentrator.

4. The system of claim 2, wherein the receiver defines a cavity into which the secondary concentrator focuses the concentrated solar flux so as to produce thermal energy in the cavity.

5. The system of claim 4, wherein the thermal storage medium comprises a thermal storage material positioned within the cavity that stores thermal energy in response to concentrated solar flux being directed into the cavity.

6. The system of claim 5, wherein the thermal storage material comprises a phase change material that changes from a first phase into a second phase in response to the concentrated solar flux being directed into the cavity and wherein the thermal storage material changes back into the first phase when less than the selected degree of solar flux is being directed into the receiver and wherein the thermal storage material releases thermal energy to the at least one thermal electrical converter stage during the phase change of the thermal storage material from the second to the first phase.

7. The system of claim 6, wherein the first phase is a solid phase and the second phase is a liquid phase.

8. The system of claim 7, wherein the thermal storage material is comprised of a material selected to provide a sufficient amount of thermal energy to the at least one thermal electrical converter stage so as to permit the at least one thermal electrical converter stage to produce a selected amount of electrical energy during periods when the sun is not providing solar flux to the concentrator system.

9. The system of claim 8, wherein the quantity of the thermal storage material is selected to provide sufficient thermal energy so that the at least one thermal electric converter stage produces a selected quantity of electrical power during substantially all of the time periods where the receiver is receiving less than the selected quantity of solar flux during a 24 hour period.

10. The system of claim 9, wherein the thermal storage material is comprised of aluminum oxide ($Al_3O_2$).

11. The system of claim 1, wherein the at least one thermal electric converter stage comprises:
a first stage that produces electrical energy when receiving thermal energy in a first temperature range; and
a second stage that receives waste thermal energy in a second temperature range from the first stage less than the first temperature range and produces electrical energy responsive thereto.

12. The system of claim 11, further comprising a third stage that receives waste thermal energy in a third temperature range less than the second temperature range and produces electrical energy responsive thereto.

13. The system of claim 12, wherein the first stage comprises at least one thermionic electrical converter (TEC) device.

14. The system of claim 12, wherein the second stage comprises at least one device selected from the group consisting of alkaline metal thermal electric converter (AMTEC) devices and TEC devices that operate between reduced temperatures.

15. The system of claim 12, and the third stage comprises a thermal electrical generator unit having a plurality of thermal photovoltaic cells.

16. The system of claim 1, wherein the receiver comprises a shutter that (a) passes the concentrated solar flux when the concentrated solar flux is provided and (b) inhibits thermal energy from escaping the thermal storage medium when the concentrated solar flux is not provided.

17. A solar power system for converting solar power into electrical power, the system comprising:
a solar flux concentrator assembly for concentrating a first flux of solar power into a concentrated second flux of solar power;
a thermal energy storage unit disposed so as to receive the second flux of solar power from the solar flux concentrator, said thermal energy storage unit converting the second flux of solar power into thermal energy;
a converter assembly having a heat flow regulator and disposed so as to receive thermal energy from the thermal energy storage unit, said converter assembly comprising cascaded first, second, and third stages that (a) respectively receive a first, second, and third input flow of heat, (b) respectively convert a portion of the first, second, and third input flows of heat into a first, second, and third output flow of electrical power, and (c) respectively output a first, second, and third output flow of heat, wherein the first stage is disposed adjacent the thermal energy storage unit so as to receive the first input flow of heat therefrom, wherein the second stage is disposed adjacent the first stage so as to receive the second input flow of heat therefrom, and wherein the third stage is disposed adjacent the second stage so as to receive the third input flow of heat therefrom and wherein the heat flow regulator regulates the flow of heat between the first and second stages.

18. The system of claim 17, wherein the solar flux concentrator comprises a first and second concentrator, said first concentrator receiving the first flux of solar power and concentrating the first flux into an intermediate flux of solar power, said second concentrator receiving the intermediate flux of solar power and further concentrating the intermediate flux into the second flux of solar power.

19. The system of claim 18, wherein the first concentrator comprises at least one Fresnel lens that includes a transparent sheet of plastic material upon which prisms have been formed.

20. The system of claim 19, wherein the at least one Fresnel lens consists of a single Fresnel lens.

21. The system of claim 19, wherein the at least one Fresnel lens always directs a portion of the intermediate flux of solar power toward the second concentrator provided that the first flux of solar power is received by the at least one Fresnel lens.

22. The system of claim 21, wherein the at least one Fresnel lens is able to pivot with respect to the second concentrator.

23. The system of claim 18, wherein first concentrator is disposed above the thermal storage unit and the converter assembly so as to protect them from the environment and so as to reduce the rate of wasted heat loss to the environment.

24. The system of claim 18, wherein second concentrator is a non-imaging concentrator.

25. The system of claim 17, wherein the thermal energy storage unit comprises a thermal storage material that (a) undergoes a first phase change from a first phase to a second phase in response to gaining thermal energy and (b) undergoes a second phase change from the second phase to the first phase in response to loosing thermal energy, said thermal storage material allowing the solar power system to produce electricity when the first solar flux is not received by the concentrator assembly.

26. The system of claim 25, wherein the first phase is a liquid phase and the second phase is a solid phase.

27. The system of claim 26, wherein thermal storage material is aluminum oxide that undergoes the first and second phase changes at a transition temperature of 2345 Kelvin.

28. The system of claim 27, wherein the temperature of the thermal storage material is substantially maintained at approximately 2500 Kelvin while the first solar flux is provided.

29. The system of claim 17, wherein the first stage of the converter assembly comprises a first port having a first temperature and a second port having a second temperature, said first port receiving the first input flow of heat, said second port outputting the first output flow of heat.

30. The system of claim 29, wherein the first stage comprises a plurality of TEC devices that operate with the first temperature approximately equal to 2400 K and the second temperature approximately equal to 1350 K.

31. The system of claim 30, wherein the second stage comprises a third port having a third temperature and a fourth port having a fourth temperature, said third port receiving the second input flow of heat, said fourth port outputting the second output flow of heat.

32. The system of claim 31, wherein the second input flow of heat is radiated from the second port of the first stage to the third port of the second stage.

33. The system of claim 32, wherein the second stage comprises a plurality of AMTEC devices that operate with the third temperature approximately equal to 1273 K and the fourth temperature approximately equal to 650 K.

34. The system of claim 33, wherein the converter assembly further comprises a heat flow regulator interposed between the first and second stages, said heat flow regulator reducing the second input flow of heat that flows into the second stage.

35. The system of claim 34, wherein the heat flow regulator is a radiant heat baffle having a plurality of various sized holes extending therethrough.

36. The system of claim 35, wherein the third input flow of heat is radiated from the fourth port of the second stage to the third stage.

37. The system of claim 36, wherein the third stage comprises a plurality of thermal photovoltaic cells.

38. The system of claim 37, further comprising a cooling assembly disposed adjacent the third stage, said cooling system dissipating heat from the third stage.

39. The system of claim 17, further comprising a shutter disposed adjacent the thermal storage unit so as to be in the path of the concentrated solar flux, said shutter comprising a reducible opening that is extended when the concentrated solar flux is provided so as to enable the concentrated solar flux to pass through the shutter, and wherein the reducible opening is reduced when the concentrated solar flux is not provided so as to inhibit thermal energy from escaping the thermal storage unit.

40. A method of producing electrical power, the method comprising:
    receiving a first flux of solar power;
    concentrating the first flux of solar power into a second flux of solar power;
    converting the second flux of solar power into thermal energy, said converting resulting in a first output flow of thermal power;
    producing a first flow of electrical power from the first output flow of thermal power, said producing of the first flow of electrical power resulting in a second output flow of thermal power;
    regulating the second output flow of thermal power to produce a second flow of electrical power from the second output flow of thermal power, said producing of the second flow of electrical power resulting in a third output flow of thermal power; and
    producing a third flow of electrical power from the second output flow of thermal power.

41. The method of claim 40, wherein concentrating the first flux of solar power into a second flux of solar power comprises:
    concentrating the first flux of solar power into an intermediate flux of solar power; and
    concentrating the intermediate flux into a second flux of solar power.

42. The method of claim 40, wherein converting the second flux of solar power into thermal energy comprises inducing a thermal storage material to undergo a first phase change between a solid phase to a liquid phase.

43. The method of claim 42, further comprising: when the first solar flux is not received, maintaining the first output flow of thermal power by extracting heat from the thermal storage material while the thermal storage material undergoes a second phase change between the liquid phase to the solid phase.

44. The method of claim 40, further comprising combining the first, second, and third output flows of electrical power into a combined output flow of electrical power.

* * * * *